US006191363B1

(12) United States Patent
Samuels

(10) Patent No.: US 6,191,363 B1
(45) Date of Patent: Feb. 20, 2001

(54) CONDUIT CONCEALING BASEBOARD MOLDING

(76) Inventor: Ronald E. Samuels, 21 - 22nd Street #8, Etobicoke, Ontario (CA), M8V 3M2

(*) Notice: Under 35 U.S.C. 154(b), the term of this patent shall be extended for 0 days.

(21) Appl. No.: 09/301,729

(22) Filed: Apr. 29, 1999

(51) Int. Cl.⁷ ............................................. H02G 3/04
(52) U.S. Cl. ............................................. 174/68.3
(58) Field of Search .................. 174/68.1, 68.3, 174/72 C, 95, 96, 97, 101

(56) References Cited

U.S. PATENT DOCUMENTS

| | | | | |
|---|---|---|---|---|
| 2,579,854 | * | 12/1951 | Perkins | 174/72 C |
| 3,262,083 | * | 7/1966 | Gooding | 174/101 |
| 3,721,762 | * | 3/1973 | Gooding | 174/72 C |
| 3,786,171 | * | 1/1974 | Shira | 174/68.3 |
| 4,534,147 | * | 8/1985 | Cristell | 174/68.3 |
| 4,589,449 | * | 5/1986 | Bramwell | 174/72 C |
| 4,629,826 | * | 12/1986 | Thomas | 174/68.3 |
| 4,723,580 | * | 2/1988 | Trautwein | 174/68.3 |
| 5,957,414 | * | 9/1999 | Perrignon de T. et al. | 174/101 |
| 6,084,180 | * | 7/2000 | DeBartolo, Jr. et al. | 174/95 |

* cited by examiner

Primary Examiner—Kristine Kincaid
Assistant Examiner—Adolfo Nino

(57) ABSTRACT

A conduit concealing baseboard molding for concealing and organizing conduits such as electrical wiring and cables running along a wall surface adjacent the floor. The conduit concealing baseboard molding includes a back plate designed for mounting to a wall surface. The back plate has a plurality of spaced apart resiliently deflectable partition walls forwardly extending therefrom to define a plurality of conduit stalls each designed for receiving a conduit therein. A generally inverted L-shaped front plate having upper and lower portions is coupled to the back plate such that the partition walls are interposed between the front and back plates.

20 Claims, 2 Drawing Sheets

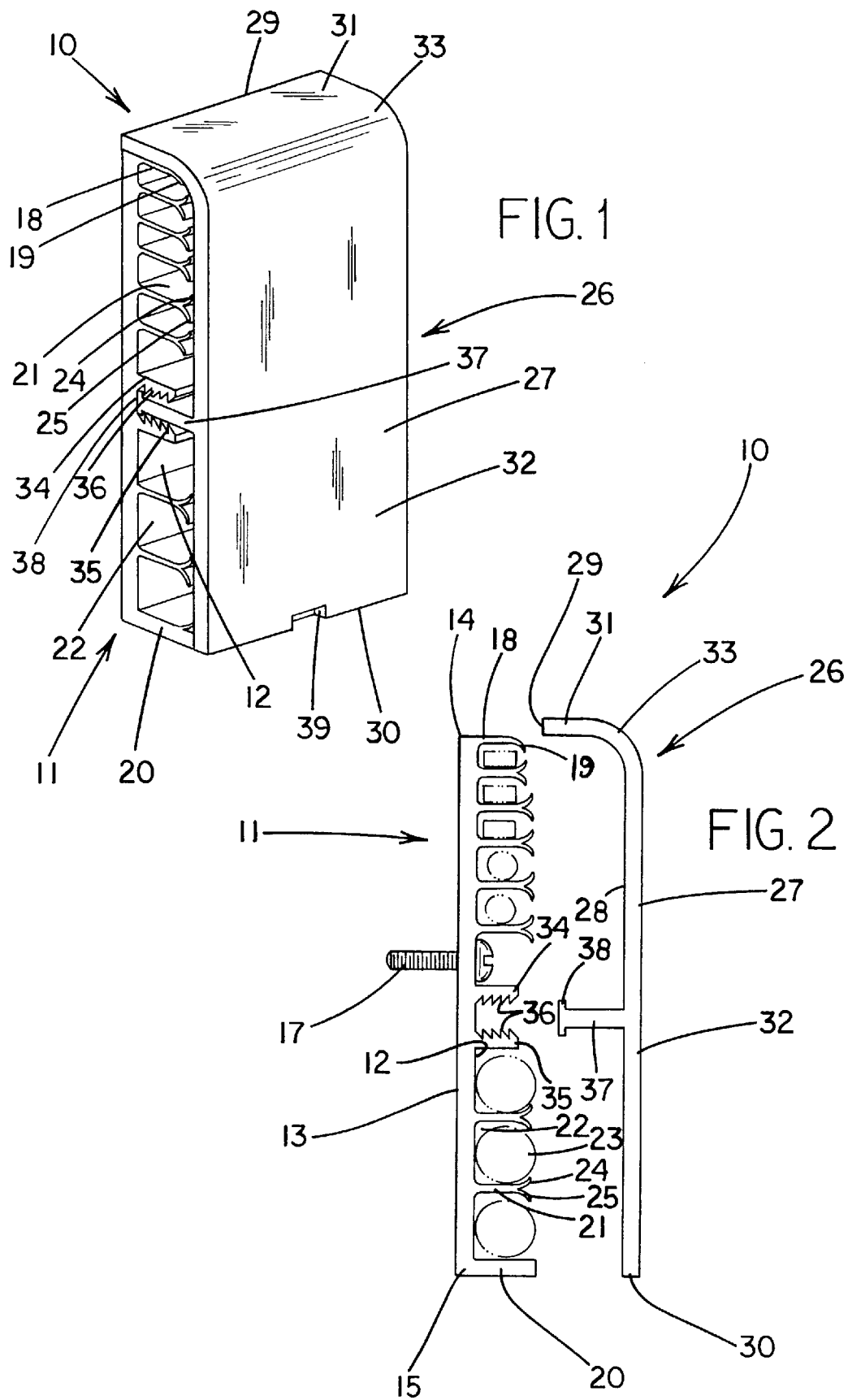

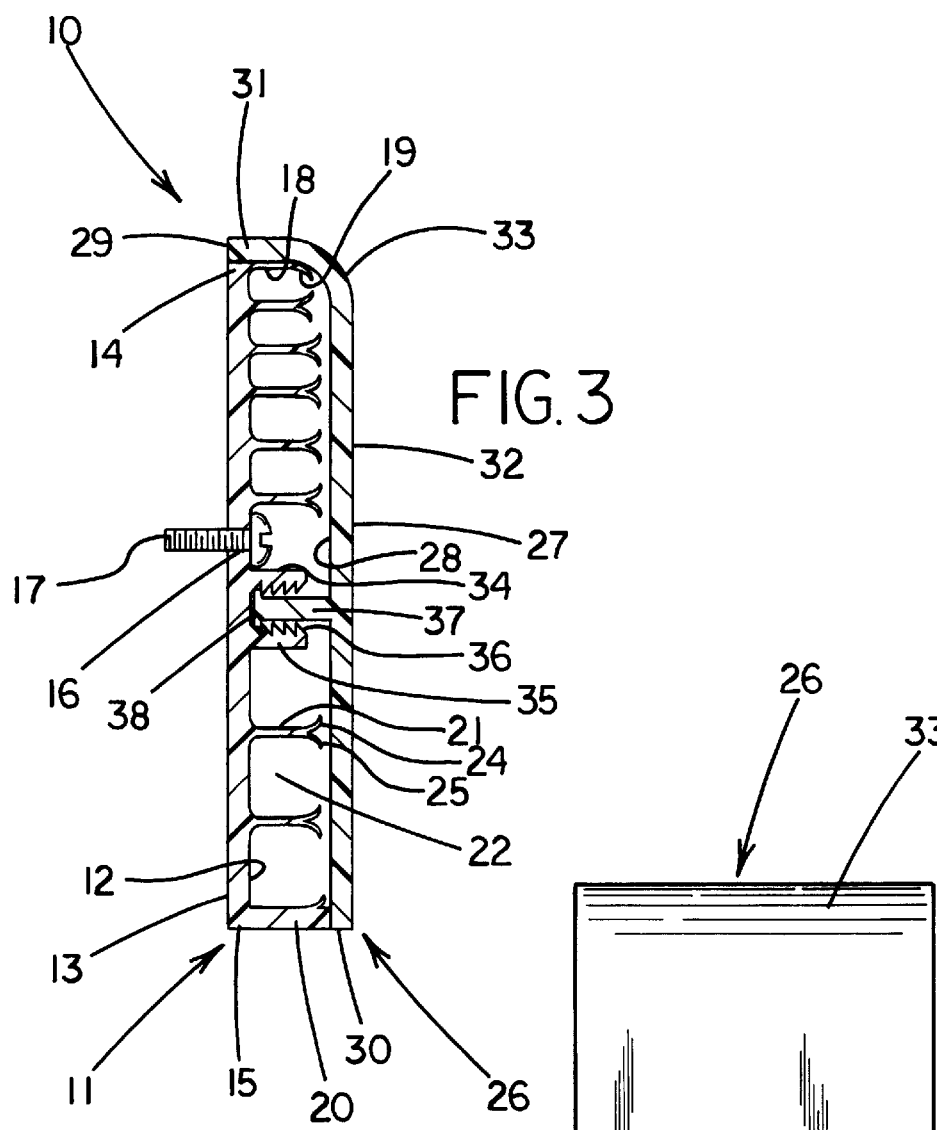
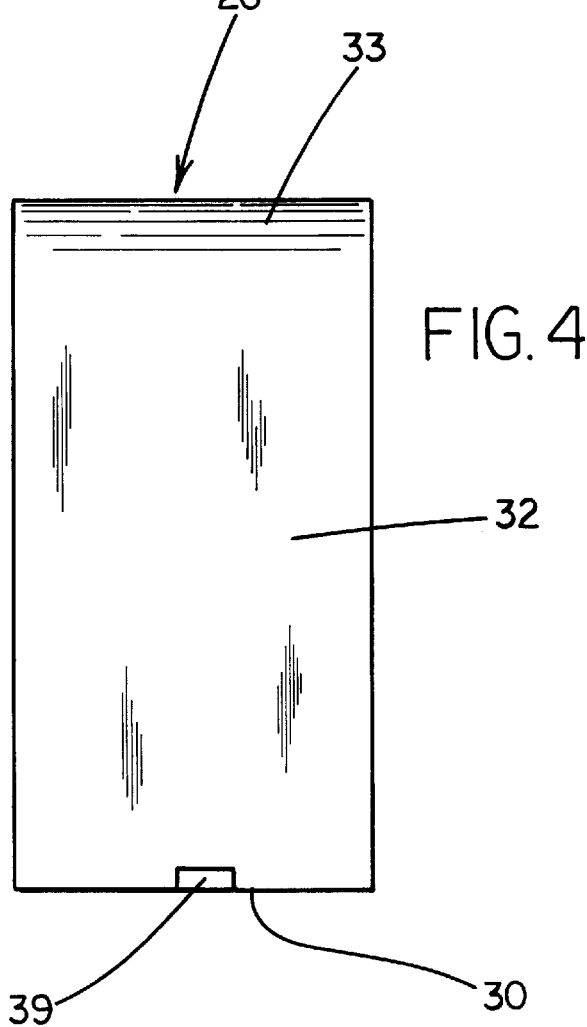

CONDUIT CONCEALING BASEBOARD MOLDING

BACKGROUND OF THE INVENTION

1. Field of the Invention

The present invention relates to conduit concealing baseboard moldings and more particularly pertains to a new conduit concealing baseboard molding for concealing and organizing conduits such as electrical wiring and cables running along a wall surface adjacent the floor.

2. Description of the Prior Art

The use of conduit concealing baseboard moldings is known in the prior art. More specifically, conduit concealing baseboard moldings heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,357,053; U.S. Pat. No. 3,911,637; U.S. Pat. No. 2,175,144; U.S. Pat. No. 1,857,378; U.S. Pat. No. 4,094,561; and U.S. Pat. No. Des. 352,791.

While these devices fulfill their respective, particular objectives and requirements, the aforementioned patents do not disclose a new conduit concealing baseboard molding. The inventive device includes a back plate designed for mounting to a wall surface. The back plate has a plurality of spaced apart resiliently deflectable partition walls forwardly extending therefrom to define a plurality of conduit stalls each designed for receiving a conduit therein. A generally inverted L-shaped front plate having upper and lower portions is coupled to the back plate such that the partition walls are interposed between the front and back plates.

In these respects, the conduit concealing baseboard molding according to the present invention substantially departs from the conventional concepts and designs of the prior art, and in so doing provides an apparatus primarily developed for the purpose of concealing and organizing conduits such as electrical wiring and cables running along a wall surface adjacent the floor.

SUMMARY OF THE INVENTION

In view of the foregoing disadvantages inherent in the known types of conduit concealing baseboard moldings now present in the prior art, the present invention provides a new conduit concealing baseboard molding construction wherein the same can be utilized for concealing and organizing conduits such as electrical wiring and cables running along a wall surface adjacent the floor.

The general purpose of the present invention, which will be described subsequently in greater detail, is to provide a new conduit concealing baseboard molding apparatus and method which has many of the advantages of the conduit concealing baseboard moldings mentioned heretofore and many novel features that result in a new conduit concealing baseboard molding which is not anticipated, rendered obvious, suggested, or even implied by any of the prior art conduit concealing baseboard moldings, either alone or in any combination thereof.

To attain this, the present invention generally comprises a back plate designed for mounting to a wall surface. The back plate has a plurality of spaced apart resiliently deflectable partition walls forwardly extending therefrom to define a plurality of conduit stalls each designed for receiving a conduit therein. A generally inverted L-shaped front plate having upper and lower portions is coupled to the back plate such that the partition walls are interposed between the front and back plates.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new conduit concealing baseboard molding apparatus and method which has many of the advantages of the conduit concealing baseboard moldings mentioned heretofore and many novel features that result in a new conduit concealing baseboard molding which is not anticipated, rendered obvious, suggested, or even implied by any of the prior art conduit concealing baseboard moldings, either alone or in any combination thereof.

It is another object of the present invention to provide a new conduit concealing baseboard molding which may be easily and efficiently manufactured and marketed.

It is a further object of the present invention to provide a new conduit concealing baseboard molding which is of a durable and reliable construction.

An even further object of the present invention is to provide a new conduit concealing baseboard molding which is susceptible of a low cost of manufacture with regard to both materials and labor, and which accordingly is then susceptible of low prices of sale to the consuming public, thereby making such conduit concealing baseboard molding economically available to the buying public.

Still yet another object of the present invention is to provide a new conduit concealing baseboard molding which provides in the apparatuses and methods of the prior art some of the advantages thereof, while simultaneously overcoming some of the disadvantages normally associated therewith.

Still another object of the present invention is to provide a new conduit concealing baseboard molding for concealing and organizing conduits such as electrical wiring and cables running along a wall surface adjacent the floor.

Yet another object of the present invention is to provide a new conduit concealing baseboard molding which includes a back plate designed for mounting to a wall surface. The back plate has a plurality of spaced apart resiliently deflectable partition walls forwardly extending therefrom to define a plurality of conduit stalls each designed for receiving a conduit therein. A generally inverted L-shaped front plate having upper and lower portions is coupled to the back plate such that the partition walls are interposed between the front and back plates.

Still yet another object of the present invention is to provide a new conduit concealing baseboard molding that keeps conduits running along a baseboard separate from one another so that they do not become tangled with each other.

Even still another object of the present invention is to provide a new conduit concealing baseboard molding that may be manufactured in any length from a few inches to several feet to suit the needs of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front perspective view of a new conduit concealing baseboard molding according to the present invention.

FIG. 2 is a schematic exploded side view of the present invention.

FIG. 3 is a schematic transverse cross sectional view of the present invention.

FIG. 4 is a schematic front view of the present invention.

DESCRIPTION OF THE PREFERRED EMBODIMENT

With reference now to the drawings, and in particular to FIGS. 1 through 4 thereof, a new conduit concealing baseboard molding embodying the principles and concepts of the present invention and generally designated by the reference numeral 10 will be described.

As best illustrated in FIGS. 1 through 4, the conduit concealing baseboard molding 10 generally comprises a back plate designed for mounting to a wall surface. The back plate has a plurality of spaced apart resiliently deflectable partition walls forwardly extending therefrom to define a plurality of conduit stalls each designed for receiving a conduit therein. A generally inverted L-shaped front plate having upper and lower portions is coupled to the back plate such that the partition walls are interposed between the front and back plates.

In use, the baseboard molding is designed for mounting to a generally vertical wall surface adjacent a generally horizontal floor surface to conceal elongate conduits running along the wall surface adjacent the floor surface. Specifically, the baseboard molding 10 comprises a substantially planar back plate 11 having substantially planar front and back faces 12,13, substantially parallel top and bottom edges 14,15, and a pair of side edges extending between the top and bottom edges of the back plate. In use, the back face of the back plate is designed for mounting to a wall surface such that the front face of the back plate faces outwards from the wall surface. Preferably, the back plate has at least one mounting hole 16 extending therethrough between the front and back face of the back plate. A threaded fastener 17 is extended through the mounting hole of the back plate and is designed for threadably inserting into the wall surface to mount the back plate to the wall surface.

The back plate has a resiliently deflectable top wall 18 forwardly extending from the front face along the top edge of the back plate between the side edges of the back plate. The top wall of the back plate preferably has a resiliently deflectable downwardly curving arcuate free edge 19 spaced apart from the front face of the back plate. The back plate also has a bottom wall 20 forwardly extending from the front face along the bottom edge of the back plate between the side edges of the back plate. The bottom wall of the back plate is preferably extended substantially perpendicular to the front face of the back plate.

The back plate has a plurality of spaced apart and substantially parallel resiliently deflectable partition walls 21 forwardly extending from the front face of the back plate and extending between the side edges of the back plate. The partition walls of the back plate are extended substantially parallel to the top and bottom walls of the back plate. The partition walls are arranged in a row between the top and bottom walls to define a plurality of conduit stalls 22 therebetween with each adjacent pair of partition walls defining one of the conduit stalls therebetween.

With reference to FIG. 2, in use, each of the conduit stalls is designed for extending therein an electrical conduit 23 such as a cable or wire including, for example: coaxial cable television wire, telephone wire, stereo wire, and electrical power cords. Each of the conduit stalls has a width defined between the adjacent pair of partition walls or top wall or bottom wall and their adjacent partition wall. Preferably, the widths of the stalls is greater towards the bottom wall than towards the top wall so that larger diameter conduits may be extended in the lower conduit stalls located towards the bottom wall and smaller diameter conduits may be extended in the upper conduit stalls located towards the top wall. In one ideal illustrative embodiment, there should be at least three wider lower stalls and at least five narrower upper stalls.

Each of the partition walls of the back plate preferably terminates at a resiliently deflectable upwardly curving arcuate upper free edge 24 and a resiliently deflectable downwardly curving arcuate lower free edge 25 such that each of the partition walls has a generally Y-shaped transverse cross section taken in a plane substantially perpendicular to the front face and the side edges of the back plate. In use, the free edges of the partition walls and the top wall are designed for resiliently holding the electrical conduits in their respective conduit stall so that the electrical conduits do not easily slip out of their respective conduit stall and thus are kept separate and untangled from one another.

The baseboard molding also includes a generally inverted L-shaped front plate 26 having forwards and rearwards faces 27,28, upper and lower edges 29,30, upper and lower portions 31,32, and a pair of side edges extending between the upper and lower edges of the front plate. The upper portion of the front plate is positioned adjacent the upper edge of the front plate and the lower portion of the front plate is positioned adjacent the lower edge of the front plate. Preferably, the upper portion of the front plate is extended substantially perpendicular to the lower portion of the front plate. In such a preferred embodiment, the front plate ideally has an arcuate rounded corner 33 connecting the upper and lower portions of the front plate together.

The front plate is positioned in front of the back plate such that the partition walls are interposed between the front and back plates and with the front face of the back plate facing the rearwards face of the front face. The upper portion of the front plate is positioned above the top wall of the back plate preferably with the upper edge substantially coplanar with the back face of the back plate. The bottom wall of the back plate preferably abuts the rearwards face of the front plate adjacent the lower edge of the front plate.

The front plate is detachably coupled to the back plate. In a preferred embodiment, the back plate has a spaced apart pair of resiliently deflectable coupling walls 34,35 outwardly extending from the front face of the back plate and extending between the side edges of the back plate ideally at a midpoint between the top and bottom edges of the back plate. The coupling walls of the back plate define a coupling channel therebetween. Preferably, each of the coupling walls has a plurality of generally triangular resilient teeth 36 inwardly extending into the coupling channel.

In such a preferred embodiment, the lower portion of the front plate has a coupling extent 37 outwardly extending from the rearwards face of the front plate. The coupling extent is ideally positioned at a midpoint on the lower portion of the front plate between the rounded corner and the lower edge of the front plate. The coupling extent preferably terminates at an end flange 38 spaced apart from the rearwards face of the front plate. The coupling extent is inserted into the coupling channel between the coupling walls. The end flange of the coupling extent engages the teeth of the coupling walls to frictionally hold the coupling extent in the coupling channel and thereby couple the front plate to the back plate.

Preferably, the forward surface of the front plate has at least one pry notch 39 therein adjacent the lower edge of the front plate. In use, the pry notch is designed for inserting a tip of a flat head screwdriver to permit prying of the front plate away from the back plate to disengage the end flange of the coupling extent from the teeth of the coupling walls to de-couple the front plate from the back plate.

Optionally, access holes may be made through the front plate to permit extension of conduits running in the conduit stalls out of the baseboard molding.

Ideally, the front and back plates comprise a resiliently plastic material. The baseboard molding ideally has a height defined between the upper portion and the lower edge of the front plate of about 93 mm. In such an ideal embodiment, the baseboard molding has a depth defined between the back face of the back plate and the forwards face of the front plate of about 17 mm. The baseboard molding may have a length defined between the side edges of the back plate or the front plate anywhere between a few inches to several feet. Ideally, the baseboard molding is constructed having a length of about 8 feet such that it may be cut into various shorter lengths as needed by the user and so that the baseboard molding can be carried around to a work site.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baseboard molding for mounting to a wall surface adjacent a floor surface to conceal elongated conduits running along the wall surface adjacent the floor surface, said baseboard molding comprising:

a back plate adapted for mounting to a wall surface;

said back plate having a plurality of spaced apart resiliently deflectable partition walls forwardly extending therefrom to define a plurality of conduit stalls each adapted for receiving a conduit therein;

a generally inverted L-shaped front plate having upper and lower portions, said front plate being coupled to said back plate such that said partition walls are interposed between said front and back plates; and wherein each of said partition walls of said back plate terminates at a resiliently deflectable upwardly curving arcuate upper free edge and a resiliently deflectable downwardly curving arcuate lower free edge.

2. The baseboard molding of claim 1, wherein said back plate has at least one mounting hole extending therethrough, and wherein a fastener is extended through said mounting hole of said back plate, said threaded fastener being adapted for threadably inserting into the wall surface to mount said back plate to the wall surface.

3. The baseboard molding of claim 1, wherein said back plate has resiliently deflectable top and bottom walls forwardly extending therefrom, said partition walls being interposed between said top and bottom walls.

4. The baseboard molding of claim 3, wherein said top wall of said back plate has a resiliently deflectable downwardly curving arcuate free edge.

5. The baseboard molding of claim 1, wherein said front plate has an arcuate rounded corner connecting said upper and lower portions of said front plate together.

6. The baseboard molding of claim 1, wherein said back plate has a spaced apart pair of resiliently deflectable coupling walls forwardly extending therefrom, wherein said coupling walls define a coupling channel therebetween, wherein said lower portion of said front plate has a coupling extent rearwardly extending therefrom, wherein said coupling extent is inserted into said coupling channel.

7. The baseboard molding of claim 6, wherein each of said coupling walls has a plurality of resilient teeth inwardly extending into said coupling channel, wherein said coupling extent terminates at an end flange, wherein said end flange of said coupling extent engages said teeth of said coupling walls to frictionally hold said coupling extent in said coupling channel and thereby couple said front plate to said back plate.

8. The baseboard molding of claim 1, wherein said front plate has at least one pry notch therein.

9. A baseboard molding for mounting to a wall surface adjacent a floor surface to conceal elongate conduits running along the wall surface adjacent the floor surface, said baseboard molding comprising:
- a substantially planar back plate having substantially planar front and back faces, substantially parallel top and bottom edges;
- said back face of said back plate being adapted for mounting to a wall surface such that said front face of said back plate faces outwards from the wall surface;
- wherein said back plate has at least one mounting hole extending theretbrough between said front and back face of said back plate;
- a threaded fastener being extended through said mounting hole of said back plate, said threaded fastener being adapted for threadably inserting into the wall surface to mount said back plate to the wall surface;
- said back plate having a resiliently deflectable top wall outwardly extending from said front face along said top edge of said back plate;
- said top wall of said back plate having a resiliently deflectable downwardly curving arcuate free edge spaced apart from said front face of said back plate;
- said back plate having a bottom wall outwardly extending from said front face along said bottom edge of said back plate;
- said bottom wall of said back plate being extended substantially perpendicular to said front face of said back plate;
- said back plate having a plurality of spaced apart and substantially parallel resiliently deflectable partition walls outwardly extending from said front face of said back plate;
- said partition walls of said back plate being extended substantially parallel to said top and bottom walls of said back plate;
- said partition walls being arranged in a row between said top and bottom walls to define a plurality of conduit stalls therebetween, each adjacent pair of partition walls defining one of said conduit stalls therebetween;
- each of said conduit stalls being adapted for extending therein an electrical conduit;
- each of said partition walls of said back plate terminating at a resiliently deflectable upwardly curving arcuate upper free edge and a resiliently deflectable downwardly curving arcuate lower free edge;
- a generally inverted L-shaped front plate having forwards and rearwards faces, upper and lower edges, upper and lower portions;
- said upper portion of said front plate being positioned adjacent said upper edge of said front plate, said lower portion of said front plate being positioned adjacent said lower edge of said front plate;
- said upper portion of said front plate being extended substantially perpendicular to said lower portion of said front plate;
- said front plate having an arcuate rounded corner connecting said upper and lower portions of said front plate together;
- said front plate being positioned in front of said back plate such that said partition walls are interposed between said front and back plates, said front face of said back plate facing rearwards face of said front face;
- said upper portion of said front plate being positioned above said top wall of said back plate, said upper edge being substantially coplanar with said back face of said back plate;
- said bottom wall of said back plate abutting said rearwards face of said front plate adjacent said lower edge of said front plate;
- said front plate being coupled to said back plate said back plate having a spaced apart pair of resiliently deflectable coupling walls outwardly extending from said front face of said back plate and extending between said side edges of said back plate at a midpoint between said top and bottom edges of said back plate;
- said coupling walls of said back plate defining a coupling channel therebetween, each of said coupling walls having a plurality of generally triangular resilient teeth inwardly extending into said coupling channel;
- said lower portion of said front plate having a coupling extent outwardly extending from said rearwards face of said front plate;
- said coupling extent terminating at an end flange spaced apart from said rearwards face of said front plate;
- said coupling extent being inserted into said coupling channel, said end flange of said coupling extent engaging said teeth of said coupling walls to frictionally hold said coupling extent in said coupling channel and thereby couple said front plate to said back plate; and
- said forward surface of said front plate having at least one pry notch therein adjacent said lower edge of said front plate.

10. A baseboard molding for mounting to a wall surface adjacent a floor surface to conceal elongated conduits running along the wall surface adjacent the floor surface, said baseboard molding comprising:
- a back plate adapted for mounting to a wall surface;
- said back plate having a plurality of spaced apart resiliently deflectable partition walls forwardly extending therefrom to define a plurality of conduit stalls each adapted for receiving a conduit therein;
- a generally inverted L-shaped front plate having upper and lower portions, said front plate being coupled to said back plate such that said partition walls are interposed between said front and back plates; and
- wherein said back plate has a spaced apart pair of resiliently deflectable coupling walls forwardly extending therefrom, wherein said coupling walls define a coupling channel therebetween, wherein said lower portion of said front plate has a coupling extent rearwardly extending therefrom, wherein said coupling extent is inserted into said coupling channel.

11. The baseboard molding of claim 10, wherein said back plate has at least one mounting hole extending therethrough, and wherein a fastener is extended through said mounting hole of said back plate, said threaded fastener being adapted for threadably inserting into the wall surface to mount said back plate to the wall surface.

12. The baseboard molding of claim 10, wherein said back plate has resiliently deflectable top and bottom walls forwardly extending therefrom, said partition walls being interposed between said top and bottom walls.

13. The baseboard molding of claim 12, wherein said top wall of said back plate has a resiliently deflectable downwardly curving arcuate free edge.

14. The baseboard molding of claim 10, wherein said front plate has an arcuate rounded corner connecting said upper and lower portions of said front plate together.

15. The baseboard molding of claim 10, wherein each of said coupling walls has a plurality of resilient teeth inwardly extending into said coupling channel, wherein said coupling extent terminates at an end flange, wherein said end flange of said coupling extent engages said teeth of said coupling walls to frictionally hold said coupling extent in said coupling channel and thereby couple said front plate to said back plate.

16. The baseboard molding of claim 10, wherein said front plate has at least one pry notch therein.

17. A baseboard molding for mounting to a wall surface adjacent a floor surface to conceal elongated conduits running along the wall surface adjacent the floor surface, said baseboard molding comprising:

a back plate adapted for mounting to a wall surface;

said back plate having a plurality of spaced apart resiliently deflectable partition walls forwardly extending therefrom to define a plurality of conduit stalls each adapted for receiving a conduit therein;

a generally inverted L-shaped front plate having upper and lower portions, said front plate being coupled to said back plate such that said partition walls are interposed between said front and back plates; and wherein said front plate has at least one pry notch therein.

18. The baseboard molding of claim 17, wherein said back plate has at least one mounting hole extending therethrough, and wherein a fastener is extended through said mounting hole of said back plate, said threaded fastener being adapted for threadably inserting into the wall surface to mount said back plate to the wall surface.

19. The baseboard molding of claim 17, wherein said back plate has resiliently deflectable top and bottom walls forwardly extending therefrom, said partition walls being interposed between said top and bottom walls.

20. The baseboard molding of claim 19, wherein said top wall of said back plate has a resiliently deflectable downwardly curving arcuate free edge.

* * * * *